United States Patent
Ishibashi et al.

(10) Patent No.: US 11,605,859 B2
(45) Date of Patent: Mar. 14, 2023

(54) BATTERY MODULE AND VEHICLE EQUIPPED WITH SAME

(71) Applicant: SANYO Electric Co., Ltd., Osaka (JP)

(72) Inventors: Kengo Ishibashi, Hyogo (JP); Takayuki Nobuhira, Hyogo (JP); Koji Fujinaga, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 125 days.

(21) Appl. No.: 17/059,286

(22) PCT Filed: May 17, 2019

(86) PCT No.: PCT/JP2019/019678
§ 371 (c)(1),
(2) Date: Nov. 27, 2020

(87) PCT Pub. No.: WO2019/235173
PCT Pub. Date: Dec. 12, 2019

(65) Prior Publication Data
US 2021/0210815 A1    Jul. 8, 2021

(30) Foreign Application Priority Data
Jun. 5, 2018  (JP) .............................. JP2018-108159

(51) Int. Cl.
*H01M 50/204*    (2021.01)
*H01M 50/262*    (2021.01)
(Continued)

(52) U.S. Cl.
CPC ......... *H01M 50/204* (2021.01); *H01M 10/04* (2013.01); *H01M 50/258* (2021.01);
(Continued)

(58) Field of Classification Search
CPC ............. H01M 50/204; H01M 50/258; H01M 50/262; H01M 50/543; H01M 50/264;
(Continued)

(56) References Cited

U.S. PATENT DOCUMENTS

2013/0316200 A1* 11/2013 Ochi ................... H01M 50/502
429/159
2015/0004469 A1*  1/2015 Park .................... H01M 50/264
429/151
(Continued)

FOREIGN PATENT DOCUMENTS

| CN | 107534196 A | 1/2018 |
| JP | 2017-016799 | 1/2017 |

OTHER PUBLICATIONS

The Extended European Search Report dated Jun. 8, 2021, issued in counterpart EP Application No. 19814524.5 (8 pages).
(Continued)

*Primary Examiner* — Maria Laios
*Assistant Examiner* — Adam J Francis
(74) *Attorney, Agent, or Firm* — WHDA, LLP (57) ABSTRACT

In order to provide a battery module and the like capable of maintaining a fastened state of a plurality of battery cells with high reliability, battery module includes a plurality of battery cells each having electrode terminals, a pair of end plates that cover both side end surfaces of battery stack including the plurality of stacked battery cells, and a plurality of fastening members that fastens end plates to each other. End plate forms overlapping portion that covers at least a portion of each fastening member covering each side surface of battery cells located on the both side end surfaces of battery stack, and overlapping portion and the fastening members are welded and fixed. According to the above configuration, by welding in a state in which a side surface of fastening member is further covered with overlapping
(Continued)

portion, there is an advantage that firm fixation can be achieved while preventing disengagement of fastening member.

6 Claims, 11 Drawing Sheets

(51) Int. Cl.
*H01M 50/543* (2021.01)
*H01M 50/258* (2021.01)
*H01M 10/04* (2006.01)

(52) U.S. Cl.
CPC ....... *H01M 50/262* (2021.01); *H01M 50/543* (2021.01); *H01M 2220/20* (2013.01)

(58) Field of Classification Search
CPC ............... H01M 50/209; H01M 10/04; H01M 10/0481; H01M 2220/20
See application file for complete search history.

(56) References Cited

U.S. PATENT DOCUMENTS

| | | | |
|---|---|---|---|
| 2015/0236326 A1* | 8/2015 | Kim | B60L 58/21 |
| | | | 429/159 |
| 2018/0019455 A1 | 1/2018 | Chen et al. | |
| 2018/0138565 A1* | 5/2018 | Lee | H01M 50/209 |
| 2019/0181403 A1* | 6/2019 | Gu | H01M 50/209 |

OTHER PUBLICATIONS

International Search Report of PCT application No. PCT/JP2019/019678 dated Aug. 6, 2019.
English Translation of Chinese Search Report dated Jun. 27, 2022, issued in counterpart CN application No. 201980037821.3. (2 pages).

* cited by examiner

BATTERY MODULE AND VEHICLE EQUIPPED WITH SAME

CROSS-REFERENCE TO RELATED APPLICATIONS

This application is a U.S. national stage application of the PCT International Application No. PCT/JP2019/019678 filed on May 17, 2019, which claims the benefit of foreign priority of Japanese patent application No. 2018-108159 filed on Jun. 5, 2018, the contents all of which are incorporated herein by reference.

TECHNICAL FIELD

The present invention relates to a battery module and a vehicle equipped with the same.

BACKGROUND ART

A battery module is used as a power supply device for driving a vehicle, a power supply device for power storage, and the like. Such a battery module is preferably configured to be capable of outputting a large current, and includes a plurality of chargeable/dischargeable battery cells connected in series or in parallel. In recent years, it has been desired to increase a capacity of the battery module, and it is particularly important to support parallelization of a large number of battery cells.

Figure 10:
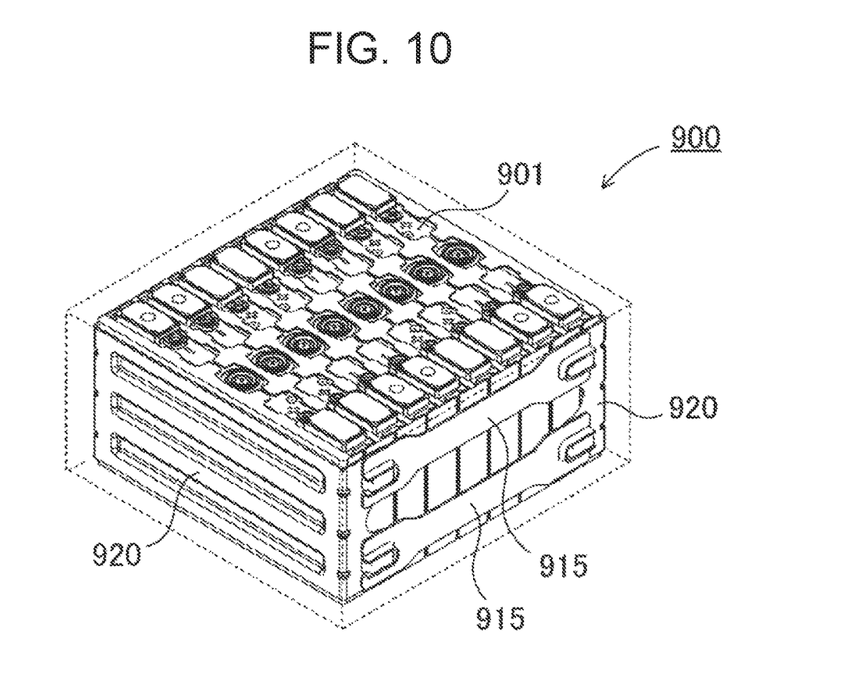
FIG. 10 is a perspective view showing a conventional power storage device.
Figure 11:
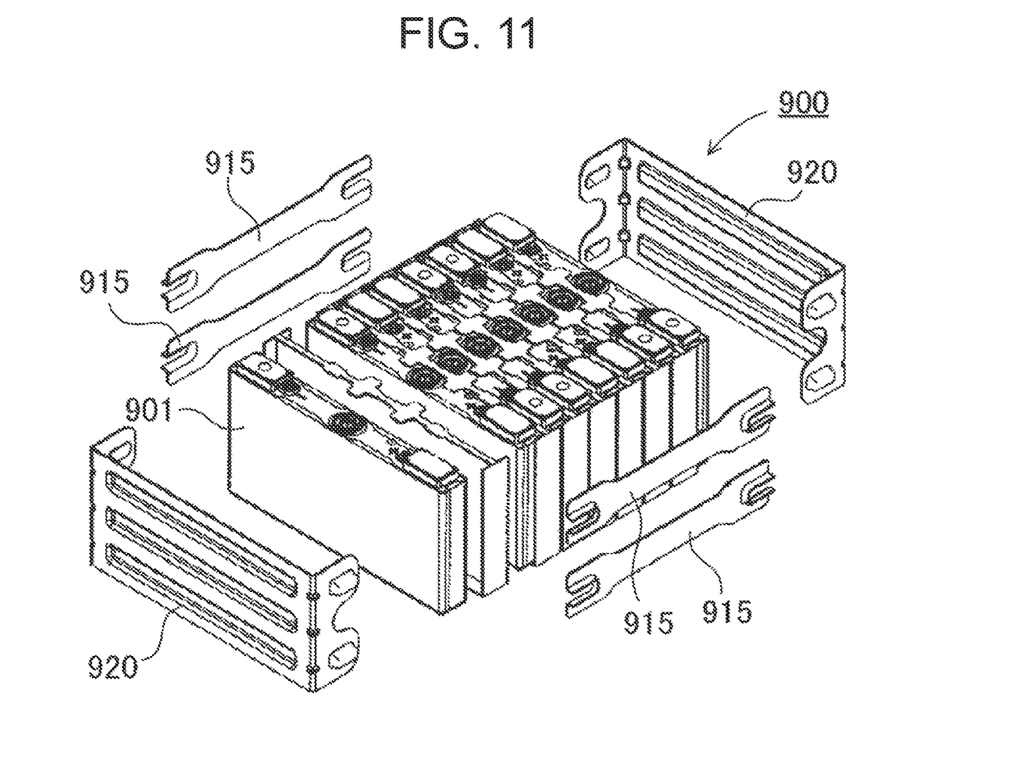
FIG. 11 is an exploded perspective view of the conventional power storage device.

As a battery module including a plurality of battery cells connected in parallel, the power storage device described in PTL 1 below is known. In power storage device 900 described in the following patent literature, as shown in FIGS. 10 and 11, a plurality of power storage elements 901 are fastened to bind bar 915 by end plate 920. Power storage device 900 includes end plate 920 disposed at an end in a first direction, which is an arrangement direction of the plurality of power storage elements 901, and bind bar 915 connected to end plate 920 and adding binding force in the first direction with respect to the plurality of power storage elements. One of end plate 920 and bind bar 915 has a base forming a surface along the first direction and a protrusion provided so as to project from the base in a second direction intersecting the first direction. The other of end plate 920 and bind bar 915 has a connection welded to at least one of the base and the protrusion.

CITATION LIST

Patent Literature

PTL 1: Unexamined Japanese Patent Publication No. 2017-16799

SUMMARY OF THE INVENTION

Figure 12:
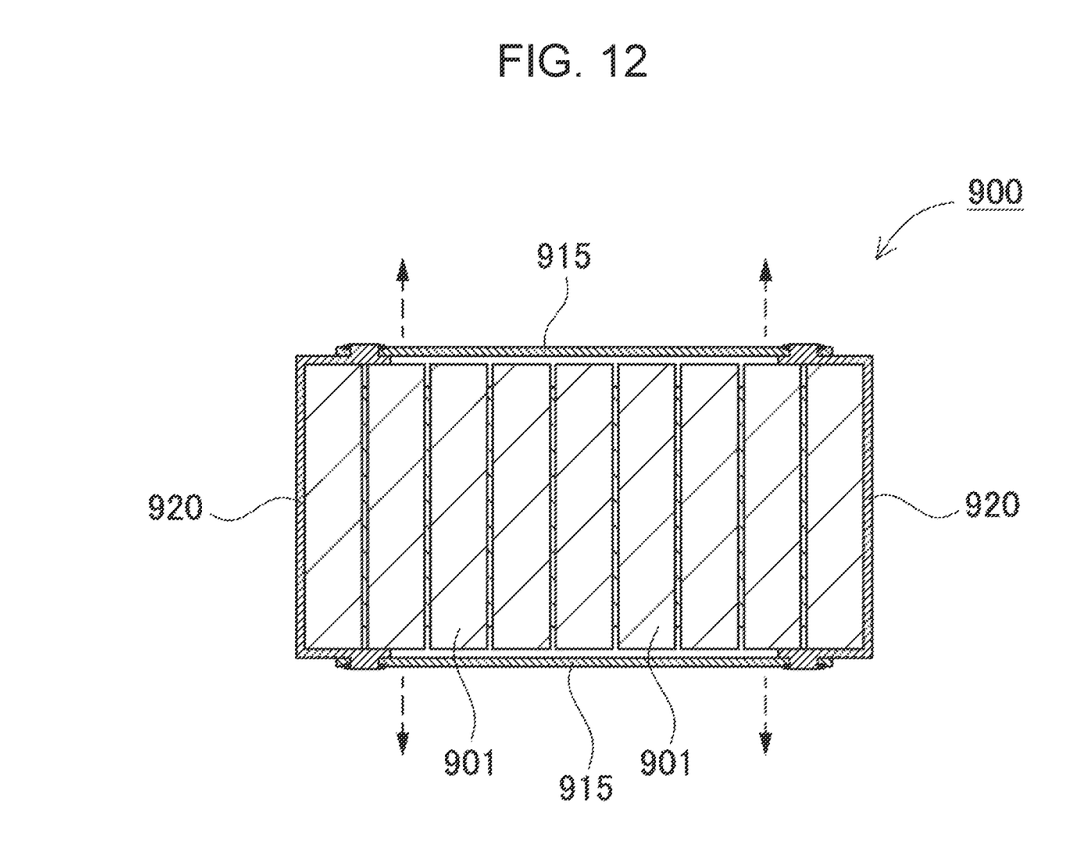
FIG. 12 is a horizontal sectional view of the conventional power storage device.

However, in such a structure, as shown in the horizontal cross-sectional view of FIG. 12, fixation of bind bar 915 is maintained only at a welded portion against vibration or impact in a direction of an arrow, and therefore, there is a possibility that the welded portion breaks and fastening by bind bar 915 is disengaged.

The present invention has been made in view of such a background, and one of the objects thereof is to provide a battery module capable of maintaining a fastened state of a plurality of battery cells with high reliability and a vehicle including the same.

A battery module according to one aspect of the present invention includes a plurality of battery cells each having electrode terminals, a pair of end plates that cover both side end surfaces of a battery stack including the plurality of stacked battery cells, and a plurality of fastening members that fasten the end plates to each other. Each of the end plates forms an overlapping portion that covers at least a portion of each of the fastening members covering each side surface of the battery cells located on the both side end surfaces of the battery stack, and the overlapping portion and the fastening members are welded and fixed.

According to the above configuration, by welding in a state in which a side surface of the fastening member is further covered with the overlapping portion, there is an advantage that firm fixation can be achieved while preventing disengagement of the fastening member.

DESCRIPTION OF EMBODIMENTS

In a battery module according to an exemplary embodiment of the present invention, the overlapping portion is continuously formed along a vertical direction of the end plate.

In a battery module according to another exemplary embodiment of the present invention, the overlapping portion is formed so as to be flush with a side surface of the end plate.

Further, in the battery module according to another exemplary embodiment of the present invention, the end plate includes overlapping portions formed on left and right side surfaces of the end plate, respectively.

An interval between the overlapping portions in plan view coincides with an interval in plan view of the battery stack.

According to the above configuration, it is possible to reduce play when the overlapping portion of the end plate covers an outside of the battery stack in which a fastening member is disposed on a side surface, to prevent floating during welding, and to improve reliability of welding.

Furthermore, in the battery module according to another exemplary embodiment of the present invention, the end plate includes a plate-shaped plate body.

The overlapping portions are fixed to respective sides of the plate body by screwing.

With the above configuration, the overlapping portion is fixed as a separate member to the left and right sides of the plate body, so that the overlapping portion can be easily provided in the end plate. In addition, by fixing the overlapping portions to the left and right sides of the plate body in a screw manner, it is easy to adjust the interval between the overlapping portions fixed to the left and right sides of the plate body, it is possible to avoid formation of a gap when a surface of the fastening member is covered with the overlapping portion, and there are also advantages that the reliability of welding can be improved and reliability of a structure for pressing the fastening member by the overlapping portion can be improved.

A vehicle according to another exemplary embodiment of the present invention includes the battery module described above, a driving motor supplied with electric power from the battery module, a vehicle body including the battery module and the motor mounted on the vehicle body, and a wheel driven by the motor to allow the vehicle body to travel.

Exemplary embodiments of the present invention will be described below with reference to the drawings. The exemplary embodiments shown below are intended as illustrative to give a concrete form to technical ideas of the present invention, and the scope of the present invention is not limited to those described below. Further, the members shown in claims attached hereto are not specifically limited to members in the exemplary embodiments. Unless specifically stated otherwise, the dimensions, materials, shapes and relative arrangements of the components described in the exemplary embodiments are given as an example and not as a limitation to the scope of the present invention. Furthermore, the sizes, positional relationship, and the like of members shown in the drawings may be exaggerated for clarity. In the description below, the same designations or the same reference numerals denote the same or like members, and duplicate descriptions will be appropriately omitted. Furthermore, the respective elements constituting the present invention may include an aspect in which a plurality of elements are constituted from the identical member and one member is allowed to serve as a plurality of elements. To the contrary, a plurality of member can also share the function of one member.

A battery module according to exemplary embodiments is used as a power source applicable to various purposes and particularly appropriate for high power or heavy current, like a power source that is mounted on an electrically driven vehicle such as a hybrid vehicle or an electric vehicle and supplies a driving motor with electric power, a power source that stores electric power generated from natural energy through solar power generation or wind power generation, or a power source that stores midnight power.

First Exemplary Embodiment

Figure 1:
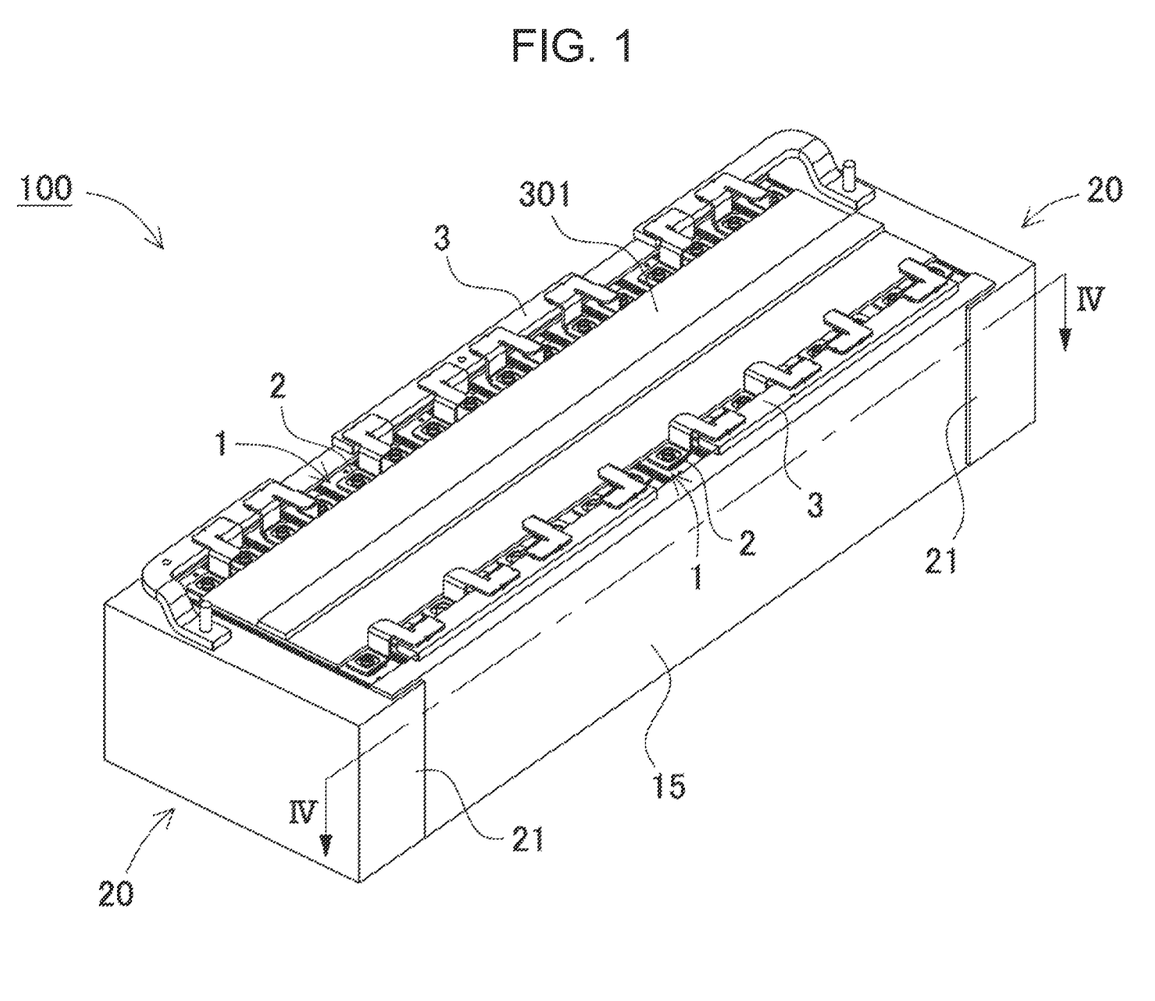
FIG. 1 is a schematic perspective view of a battery module according to a first exemplary embodiment of the present invention.
Figure 2:
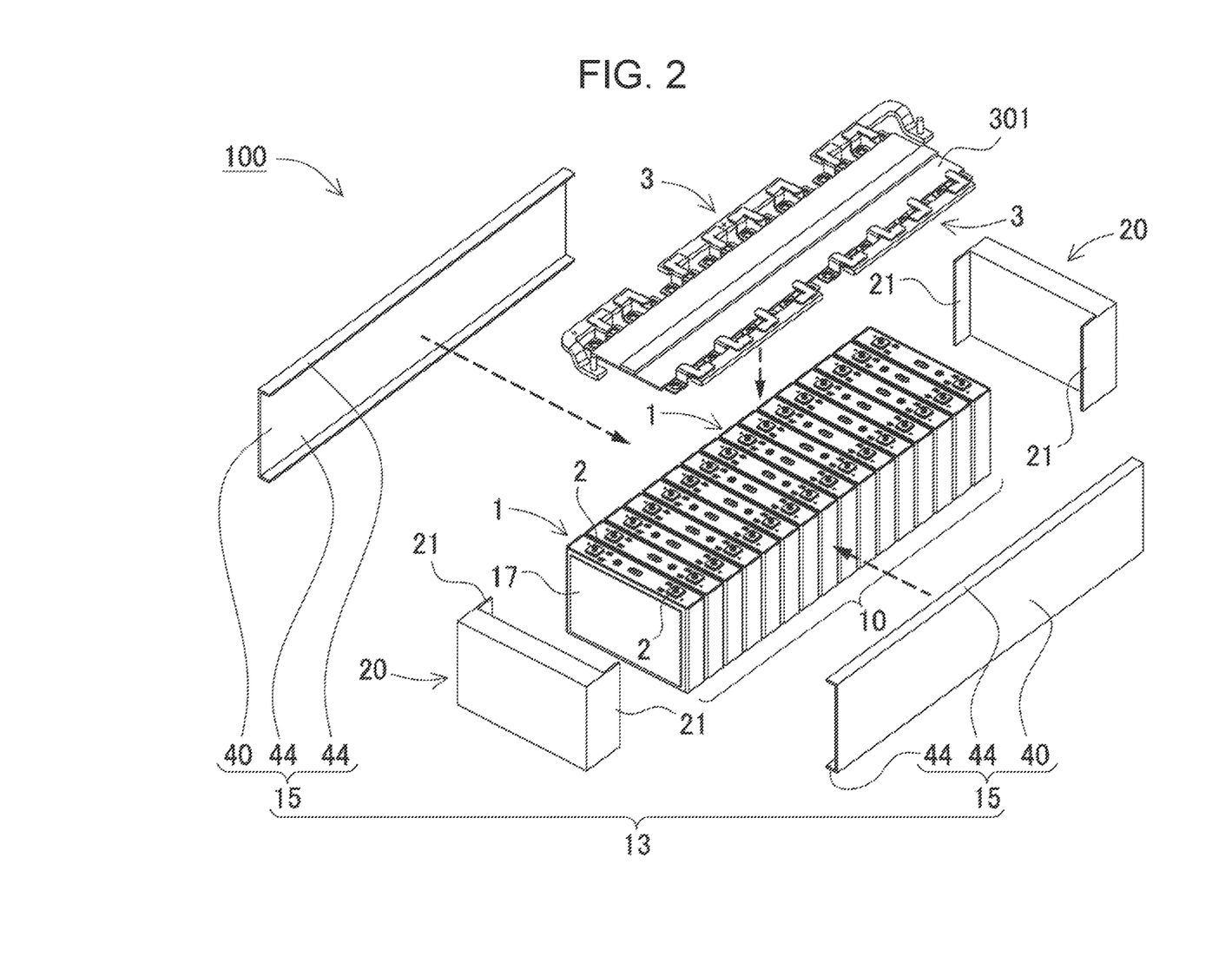
FIG. 2 is an exploded perspective view of the battery module shown in FIG. 1.
Figure 3:
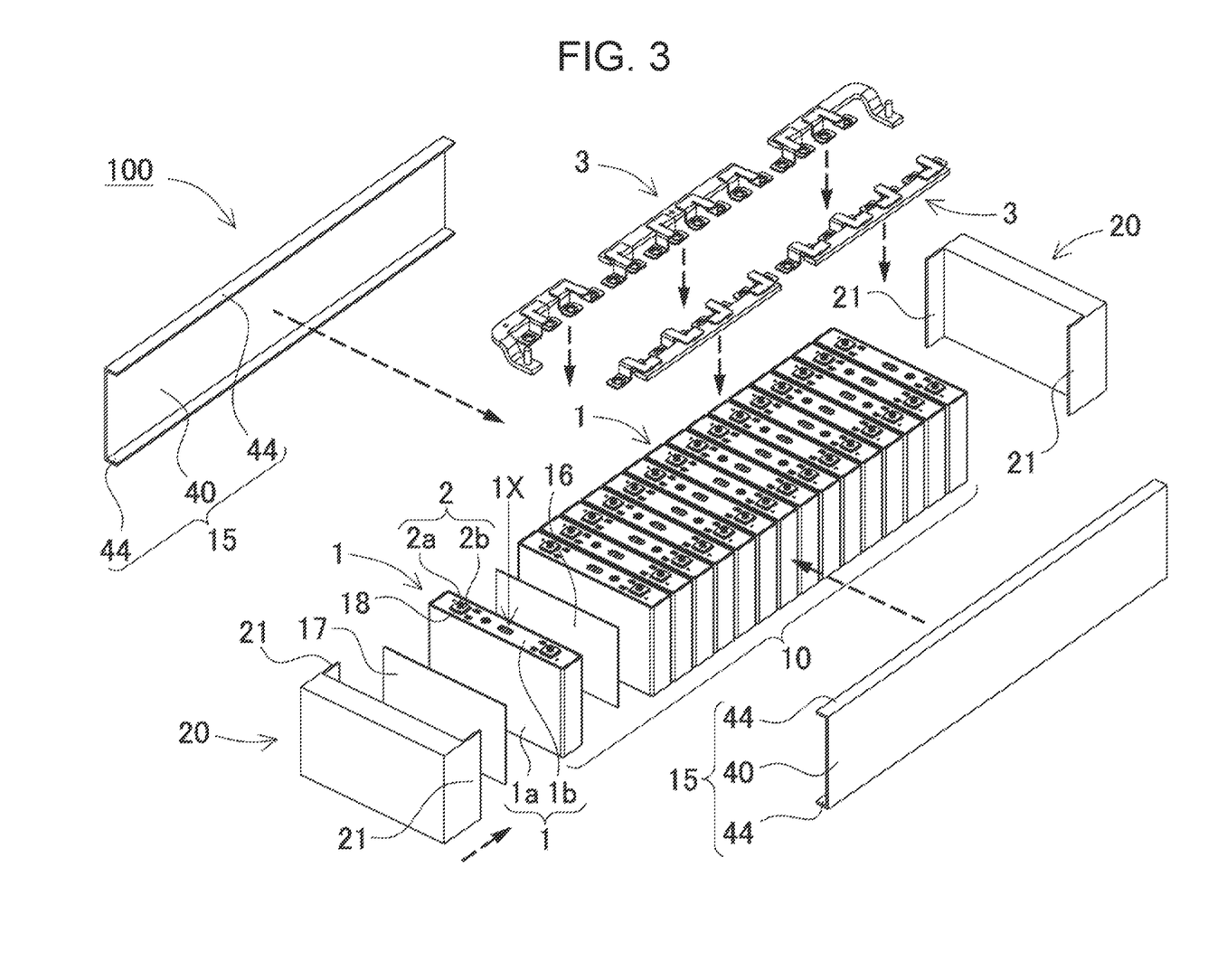
FIG. 3 is an exploded perspective view showing a state in which a bus bar holder is omitted from the battery module shown in FIG. 2.

A perspective view of battery module 100 according to a first exemplary embodiment of the present invention is shown in FIG. 1, an exploded perspective view of battery module 100 is shown in FIG. 2, and an exploded perspective view in which bus bar holder 301 is omitted from FIG. 2 is shown in FIG. 3. Battery module 100 shown in FIGS. 1 and 2 includes a plurality of battery cells 1 including positive and negative electrode terminals 2, bus bar 3 connected to electrode terminal 2 of the plurality of battery cells 1 and connecting the plurality of battery cells 1 in parallel and in series, and bus bar holder 301 holding bus bar 3, and the plurality of battery cells 1 are connected in parallel and in series via bus bars 3. Battery cell 1 is a chargeable/dischargeable secondary battery. In battery module 100, the plurality of battery cells 1 are connected in parallel to form a parallel battery group, a plurality of the parallel battery groups are connected in series, and a large number of battery cells 1 are connected in parallel and in series. In battery module 100 shown in FIG. 1 and FIG. 2, the plurality of battery cells 1 are stacked to form battery stack 10, and battery stack 10 is fixed with fixing component 13 to fix the plurality of battery cells 1 in a stacked state. Fixing component 13 includes a pair of end plates 20 disposed on both end surfaces of stacked battery cells 1, and fastening member 15 fixing stacked battery cells 1 in a pressurized state to end plate 20 so that an end of fastening member 15 is connected to end plate 20.

(Battery Cell 1)

Battery cell 1 is a prismatic battery whose main surface which is a wide surface has a quadrangular outer shape, and has a thickness smaller than the width. Furthermore, battery cell 1 is a chargeable/dischargeable secondary battery, and is a lithium ion secondary battery. However, the present invention does not specify the battery cell as a prismatic battery or a lithium ion secondary battery. For the battery cells, all rechargeable batteries, for example, non-aqueous electrolyte secondary batteries other than lithium ion secondary batteries, nickel water battery cells, etc. can be used.

As shown in FIG. 3, in battery cell 1, an electrode body in which positive and negative electrode plates are stacked is housed in exterior can 1$a$, and exterior can 1$a$ is filled with an electrolyte solution and airtightly sealed. Exterior can 1$a$ is formed in a rectangular tube shape with a closed bottom, and an upper opening is airtightly closed with sealing plate 1$b$ made of a metal sheet. Exterior can 1$a$ is produced by deep drawing a metal sheet such as aluminum or aluminum alloy. Like exterior can 1$a$, sealing plate 1$b$ is formed of a metal sheet such as aluminum or aluminum alloy. Sealing plate 1$b$ is inserted into the opening of exterior can 1$a$, a boundary between an outer periphery of sealing plate 1$b$ and an inner periphery of exterior can 1$a$ is irradiated with a laser beam, and sealing plate 1$b$ is laser-welded to exterior can 1$a$ and fixed airtightly.

(Electrode Terminal 2)

In battery cell 1, sealing plate 1$b$ which is a top surface is used as terminal surface 1X, and positive and negative electrode terminals 2 are fixed to both ends of terminal surface 1X. As shown in FIG. 3, positive and negative electrode terminals 2 are fixed to sealing plate 1$b$ via insulating material 18 and are connected respectively to built-in positive and negative electrode plates (not shown). Positive and negative electrode terminals 2 are provided with welding surface 2$b$ around protrusion 2$a$. Welding surface 2$b$ has a planar shape parallel to a surface of sealing plate 1$b$, and protrusion 2$a$ is provided at a central portion of welding surface 2$b$. Electrode terminal 2 has cylindrical protrusion 2$a$. However, the protrusion does not necessarily have to have a cylindrical shape, and may have a polygonal cylindrical shape or an elliptic cylindrical shape, although not shown.

The positions of positive and negative electrode terminals 2 fixed to sealing plate 1$b$ of battery cell 1 are positions where the positive electrode and the negative electrode are symmetrical. Consequently, battery cells 1 are inverted laterally and stacked, and positive and negative electrode terminals 2 located adjacent and in proximity to each other are connected by bus bar 3, whereby battery cells 1 adjacent to each other can be connected in series.

(Battery Stack 10)

The plurality of battery cells 1 are stacked such that a thickness direction of each battery cell 1 is a stacking direction to form battery stack 10. In battery stack 10, the plurality of battery cells 1 are stacked such that terminal surfaces 1X on which positive and negative electrode terminals 2 are provided, which are sealing plates 1b in the figure are flush with each other.

As shown in FIG. 3, in battery stack 10, insulating spacer 16 is sandwiched between stacked battery cells 1. Insulating spacer 16 in the figure is formed in a thin plate shape or a sheet shape with an insulating material such as resin. Insulating spacer 16 shown in the figure has a plate shape having substantially the same size as an opposite surface of battery cell 1, and insulating spacer 16 is stacked between battery cells 1 adjacent to each other, so that adjacent battery cells 1 are insulated from each other. As the spacer disposed between adjacent battery cells 1, a spacer having a shape in which a cooling gas flow path is formed between battery cell 1 and the spacer can also be used. A surface of battery cell 1 may be covered with an insulating material. For example, surfaces of the exterior can excluding portions provided with the electrodes of the battery cells may be thermally welded with a shrink tube made of polyethylene terephthalate (PET) resin or the like. Insulating spacer 16 may not be provided in this case. Since battery module 100 according to the exemplary embodiment includes the plurality of battery cells having a plurality of sets connected in series of a plurality of battery cells connected in parallel, insulating spacer 16 is sandwiched between the battery cells connected in series; however, insulating spacer between the battery cells connected in parallel may be omitted because the adjacent exterior cans have no difference in voltage.

Battery module 100 shown in FIG. 3 further includes end plates 20 disposed at both end surfaces of battery stack 10 with end surface spacers 17 being interposed. As shown in FIG. 3, end surface spacers 17 are each disposed between battery stack 10 and end plate 20 to insulate end plate 20 from battery stack 10. Each of end surface spacers 17 is formed in a thin plate shape or a sheet shape with an insulating material such as resin. Each of end surface spacers 17 shown in the figure is sized and shaped to entirely cover the opposite surface of rectangular battery cell 1 and is stacked between battery cell 1 disposed at each end of battery stack 10 and end plate 20.

In battery stack 10, positive and negative electrode terminals 2 of adjacent battery cells 1 are connected to metal bus bars 3 via which the plurality of battery cells 1 are connected in parallel and in series. In battery stack 10, the plurality of battery cells 1 connected in parallel to configure parallel battery group is stacked such that positive and negative electrode terminals 2 provided at the both ends of terminal surfaces 1X are aligned bilaterally unidirectionally, whereas the plurality of battery cells 1 configuring parallel battery groups connected in series are stacked such that positive and negative electrode terminals 2 provided at the both ends of terminal surfaces 1X are inverted bilaterally. Here, battery module 100 according to the first exemplary embodiment shown in FIG. 3 includes twelve battery cells 1 stacked in the thickness direction to configure battery stack 10, in which four battery cells 1 are connected in parallel to configure the parallel battery group and three parallel battery groups are connected in series to have twelve battery cells 1 including three sets connected in series of four battery cells connected in parallel. Accordingly, in battery stack 10 shown in FIG. 3, four battery cells 1 configuring the parallel battery group are stacked such that positive and negative electrode terminals 2 are aligned bilaterally unidirectionally and three parallel battery groups each including four battery cells 1 stacked unidirectionally are stacked such that positive and negative electrode terminals 2 are alternately inverted bilaterally. However, the present invention should not limit a number and connection states of the battery cells configuring the battery stack. The number and the connection states of the battery cells configuring the battery stack may be modified in various manners, inclusive of other exemplary embodiments to be described later.

Battery module 100 according to the exemplary embodiment includes battery stack 10 provided with the plurality of stacked battery cells 1, and electrode terminals 2 of the plurality of battery cells 1 adjacent to each other are connected via bus bars 3 to connect the plurality of battery cells 1 in parallel and in series.

(Bus Bar Holder 301)

In battery module 100, as shown in FIG. 1 and FIG. 2, bus bar holder 301 is disposed between battery stack 10 and bus bars 3 to insulate the plurality of bus bars 3 from each other, insulate the terminal surfaces of the battery cells from bus bars 3, and dispose the plurality of bus bars 3 at the fixed positions on an upper surface of battery stack 10. For example, such bus bar holder 301 may include a holder body having an inner space provided with the plurality of bus bars 3 and divided into a plurality of portions serving as divisional chambers for bus bars 3. Bus bar holder 301 is made of, for example, an insulating material such as plastic and allows the plurality of bus bars 3 to be fitted at the fixed positions to insulate the electrode terminals having potential difference and dispose the plurality of bus bars 3 at the fixed positions on the upper surface of battery stack 10. In FIG. 3 and subsequent figures, the illustration of bus bar holder 301 disposing the plurality of bus bars 3 at fixed positions is omitted, for clearer depiction of the connection state between the battery cells and bus bars 3.

(Bus Bar 3)

Bus bar 3 is produced by cutting and processing a metal sheet to have a predetermined shape. The metal sheet configuring bus bar 3 may be made of a metal having small electrical resistance and light weight, such as aluminum, copper, or any one of alloys of such metals. The metal sheet configuring bus bar 3 may alternatively be made of any other metal or an alloy of the metal having small electrical resistance and light weight.

(End Plate 20)

As shown in FIG. 1 to FIG. 3, end plates 20 are disposed at both ends of battery stack 10 and are fastened via fastening members 15 disposed along both side surfaces of battery stack 10. End plates 20 are both ends of battery stack 10 in the stacking direction of battery cells 1, and are disposed outside end surface spacer 17 to sandwich battery stack 10 from both ends.

End plate 20 has a quadrangular outer shape and is disposed so as to face the end surface of battery stack 10. End plate 20 shown in FIG. 1 to FIG. 3 has an outer shape substantially equal to the outer shape of battery cell 1. That is, a lateral width of end plate 20 shown in the figure is substantially equal to the width of battery cell 1, and a vertical height of end plate 20 is substantially equal to the height of battery cell 1. In this specification, the vertical direction means the vertical direction in the figure, and the lateral direction means the lateral direction in the figure, which means a horizontal direction orthogonal to the stacking direction of the batteries.

(Fastening Member 15)

As shown in FIG. 1 to FIG. 3, fastening member 15 extends in the stacking direction of battery stack 10. Both ends of fastening member 15 are fixed to end plates 20 disposed on both end surfaces of battery stack 10, and battery stack 10 is fastened in the stacking direction via end plate 20. Fastening members 15 are metal sheets each having a predetermined width and a predetermined thickness along the side surface of battery stack 10, and are disposed so as to face both side surfaces of battery stack 10. A metal sheet such as iron, preferably a steel sheet, can be used for fastening member 15. Fastening member 15 made of a metal sheet is bent by press forming or the like to be formed in a predetermined shape.

Fastening member 15 includes main body 40 disposed along the side surface of battery stack 10 and bent portion 44 bent at both upper and lower ends of main body 40 to cover the upper and lower ends of battery stack 10. Main body 40 has a rectangular shape having a size that covers almost the entire side surface of battery stack 10. Main body 40 shown in FIG. 2 covers almost the entire side surface of battery stack 10 without gaps. However, the main body may be provided with one or more openings so that a portion of the side surface of the battery stack can be exposed. In fastening member 15, both ends in a longitudinal direction are fixed to the pair of end plates 20. Furthermore, fastening member 15 shown in the figure includes bent portion 44 that holds the upper surface and the lower surface of battery stack 10 along an upper end portion of main body 40. Bent portion 44 holds the upper surface and the lower surface of battery cell 1 constituting battery stack 10 to prevent the position of terminal surface 1X of each battery cell 1 from being displaced vertically.

In the fastening member, although not shown, an insulating sheet is disposed on inner surfaces of the main body and the bent portion, and the insulating sheet can insulate the battery cell of the battery stack from the fastening member. Furthermore, in the fastening member, although not shown, cushioning materials may be disposed on the inner surfaces of both ends of the main body to protect both side surfaces of the end plate from impacts such as vibration.

(Overlapping Portion 21)

In end plate 20, overlapping portion 21 is formed. Overlapping portion 21 is configured to cover at least a portion of each fastening member 15 that covers side surfaces of battery cells 1 located on both side end surfaces of battery stack 10. In the example of the horizontal sectional view of FIG. 4, an end edge of fastening member 15 is covered with overlapping portion 21. In end plate 20, overlapping portions 21 are formed on the left and right side surfaces, respectively. Furthermore, overlapping portion 21 is continuously formed along the vertical direction of end plate 20.

Figure 4:
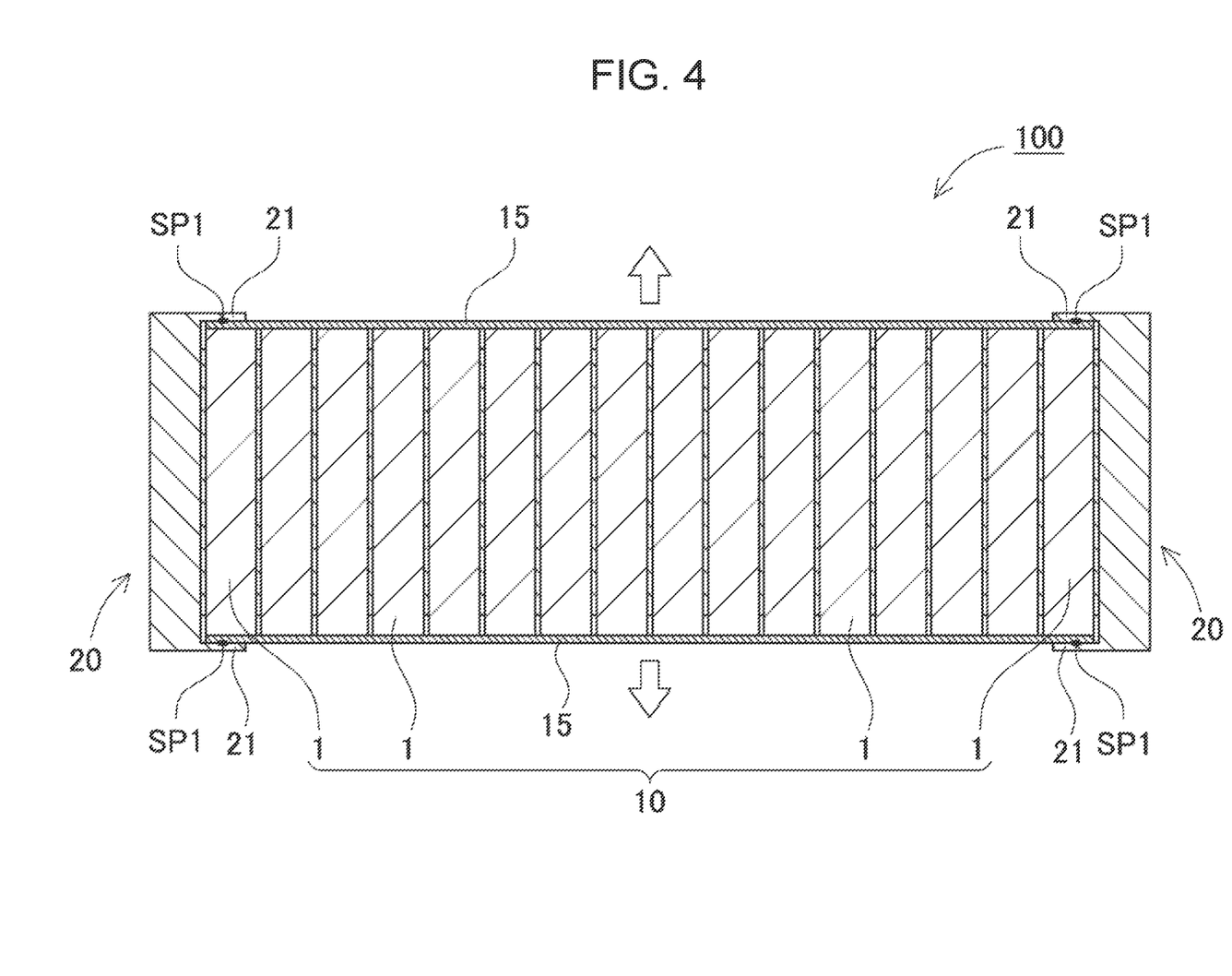
FIG. 4 is a cross-sectional view taken along line IV-IV of the battery module shown in FIG. 1.

Overlapping portion 21 and fastening member 15 are fixed by welding. Welding is preferably performed by spot welding using a laser beam, and a range from a surface of overlapping portion 21 to a position indicated by SP1 in FIG. 4 is welded. In addition, an interval between overlapping portions 21 in plan view is substantially the same as an interval in plan view of battery stack 10. Thus, it is possible to reduce play when overlapping portion 21 of end plate 20 covers an outside of battery stack 10 in which fastening member 15 is disposed on the side surface, to prevent floating during welding, and to improve reliability of welding.

As described above, in addition to welding, fastening member 15 is sandwiched by overlapping portion 21, so that battery stack 10 can be protected from stress in a width direction of battery stack 10, that is, in a direction intersecting a stacking layer direction of battery cell 1. That is, in a conventional configuration shown in the horizontal sectional view of FIG. 12, since the fastening member is fixed only by welding, if a welded portion is constantly loaded and damaged due to aging degradation or the like, the battery cell cannot be fastened. In particular, since the battery cell expands by repeating charging and discharging, stress is applied not only in the stacking direction of the battery cell but also in the width direction (the direction indicated by the arrow in FIG. 12) orthogonal to the stacking direction, so that the stress is applied to a direction of peeling the fastening member. Battery modules mounted on vehicles are also subjected to loads during vibration and impact. Thus, as a result of the fastening member being continuously exposed to the stress in the direction of the arrow, there is a possibility of deterioration and breakage.

On the other hand, according to battery module 100 according to the first exemplary embodiment, as shown in the horizontal sectional view of FIG. 4, since fastening member 15 is held not only by welding but also by overlapping portion 21, load on the welded portion is relatively reduced with respect to the stress in the width direction of battery stack 10, and reliability can be improved.

In the examples of FIG. 1 and the like, overlapping portion 21 is formed so as to be flush with the side surface of end plate 20. Here, overlapping portion 21 is integrally molded with end plate 20, and the side surface of end plate 20 is extended so that end plate 20 has a concave horizontal sectional shape.

Second Exemplary Embodiment

However, the present invention is not limited to the configuration in which overlapping portion 21 is integrally molded with end plate 20, and the overlapping portion may be a separate member from the end plate. Such an example is shown in the exploded perspective view of FIG. 5 and the horizontal sectional view of FIG. 6 as battery module 200 according to a second exemplary embodiment. End plate 20B is constituted of plate body 25 and overlapping portions 21B fixed to the left and right sides of plate body 25, respectively. Each overlapping portion 21B has an L-shaped horizontal sectional view and includes rectangular parallelepiped block portion 22 having approximately the same size as the side surface of plate body 25 and covering surface 23 that constitutes a side surface of end plate 20B with one surface of block portion 22, protrudes to be flush with this surface, and covers fastening member 15. As described above, by providing overlapping portion 21B as a separate member and fixing overlapping portions 21B to left and right sides of plate body 25, overlapping portion 21B in which an end surface of end plate 20B protrudes is easily formed on end plate 20B, which is advantageous in the manufacturing process.

Figure 5:
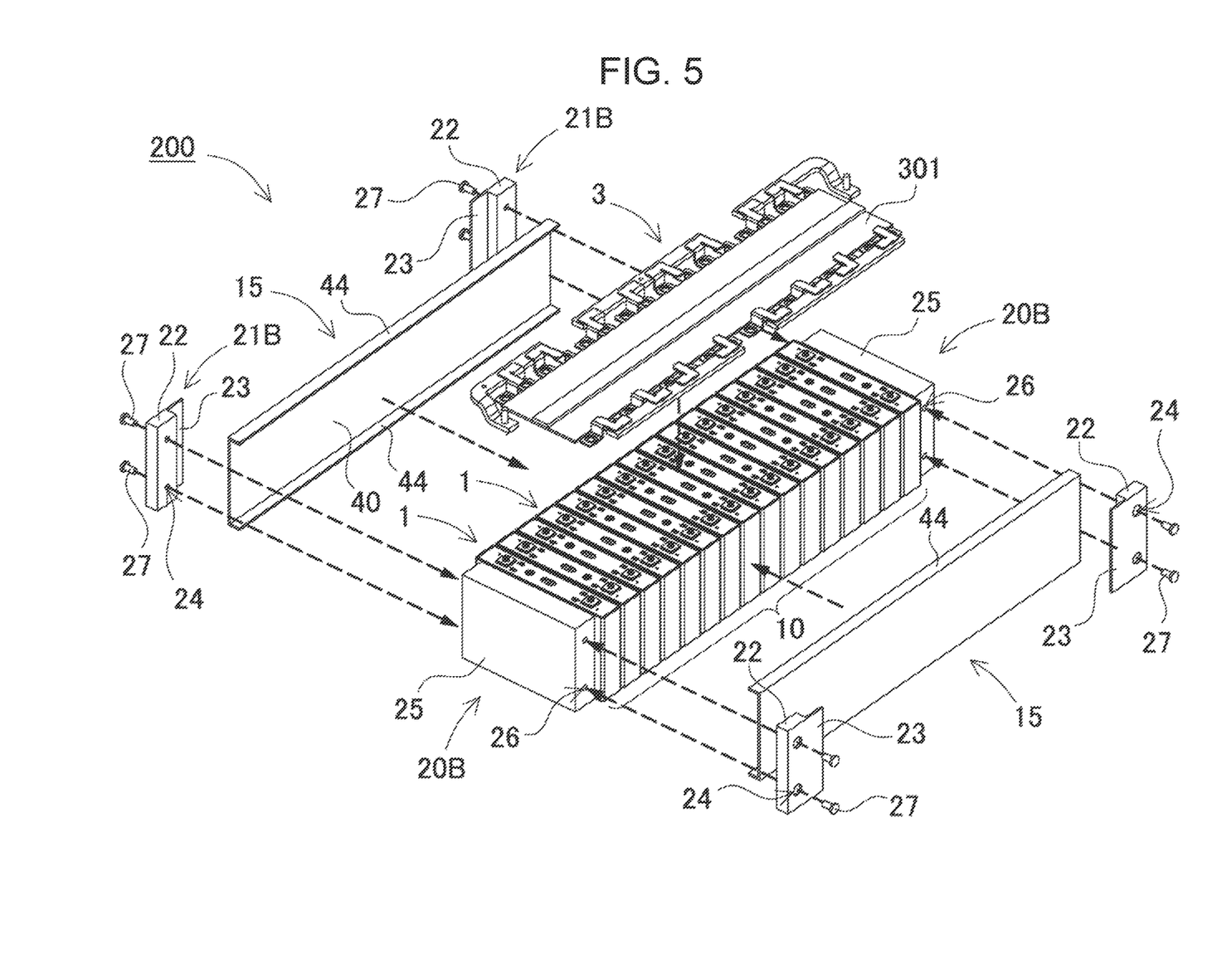
FIG. 5 is an exploded perspective view of a battery module according to a second exemplary embodiment.
Figure 6:
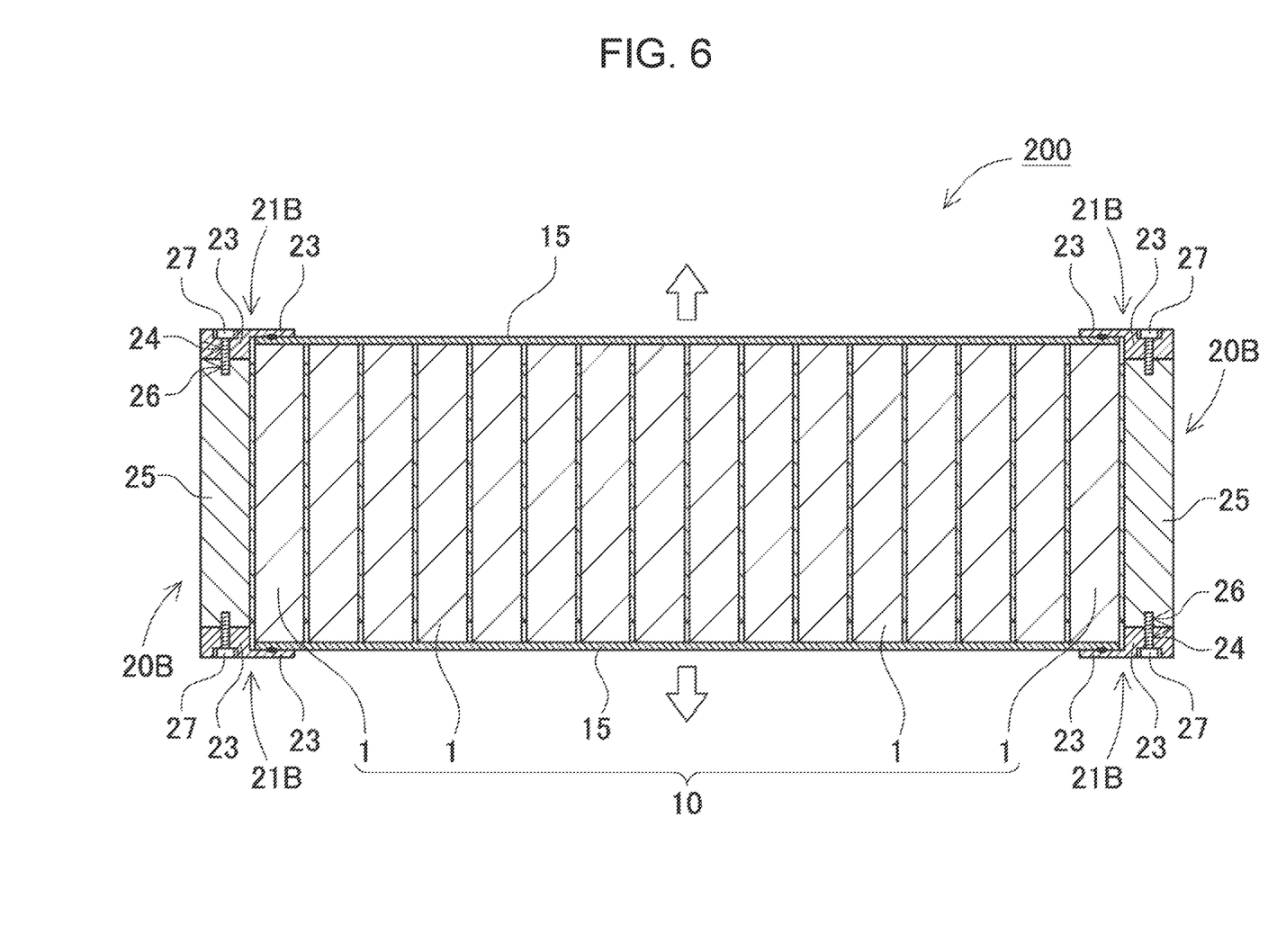
FIG. 6 is a horizontal sectional view of the battery module shown in FIG. 5.

Each overlapping portion 21B is fixed to the left and right sides of plate body 25 by screwing. Thus, block screw holes 24 are opened in block portion 22. In addition, on left and right side surfaces of plate body 25, plate screw holes 26 are opened at positions corresponding to block screw holes 24. Consequently, overlapping portions 21B can be screwed on the left and right sides of plate body 25 with bolts 27 to be firmly fixed. With this configuration, it is possible to easily adjust an interval between overlapping portions 21B fixed to the left and right sides of plate body 25. As a result, it is possible to avoid formation of a gap when a surface of fastening member 15 is covered with overlapping portion 21B, and there are also advantages that the reliability of welding can be improved and reliability of a structure for pressing fastening member 15 by overlapping portion 21B can be improved.

The above battery module can be used as a vehicle-mounted power source. Examples of such a vehicle equipped with a battery module include electrically driven vehicles such as a hybrid vehicle or a plug-in hybrid vehicle travelling by both an engine and a motor, and an electric vehicle that travelling only by a motor. The battery module is applied as a power source of such a vehicle. Exemplarily described below is battery module 1000 achieving large capacity and high output power by connecting a large number of the battery modules described above in series and in parallel and additionally providing necessary control circuits, to obtain electric power used to drive the vehicle.

(Battery Module for Hybrid Vehicle)

Figure 7:
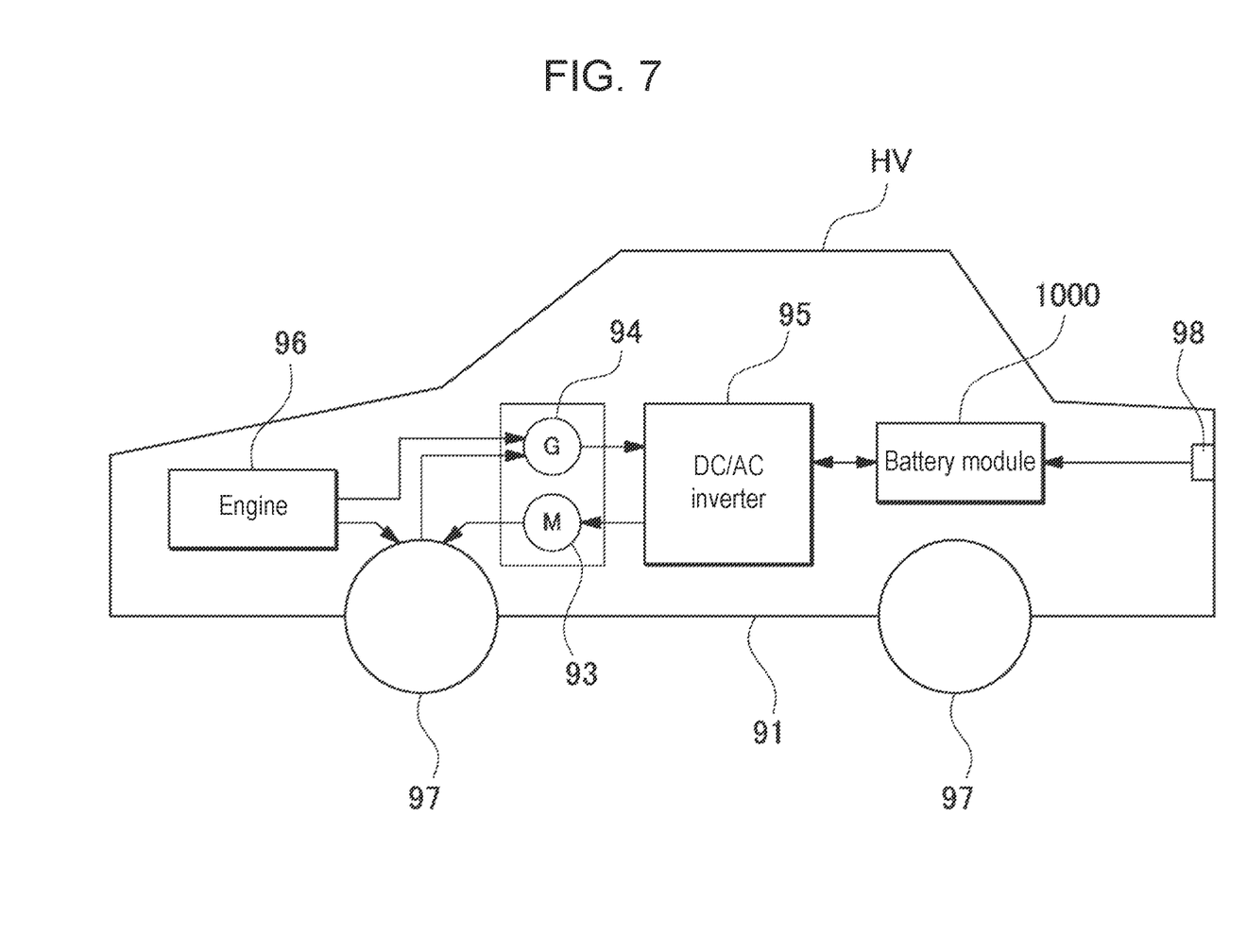
FIG. 7 is a block diagram showing an example in which the battery module is mounted on a hybrid vehicle travelling by both an engine and a motor.

FIG. 7 shows an example in which the battery module is mounted on a hybrid vehicle travelling by both an engine and a motor. Vehicle HV shown in this figure and equipped with the battery module includes vehicle body 91, engine 96 and motor 93 used to travel vehicle body 91, wheels 97 driven by engine 96 and motor 93, battery module 1000 that supplies motor 93 with electric power, and power generator 94 that charges batteries included in battery module 1000. Battery module 1000 is connected to motor 93 and power generator 94 via DC/AC inverter 95. Vehicle HV travels by both motor 93 and engine 96 while charging and discharging the batteries in battery module 1000. Motor 93 is driven to travel the vehicle during acceleration and during travel at low speed having poor engine efficiency. Motor 93 is driven when electric power is supplied from battery module 1000. Power generator 94 is driven by engine 96 or driven through regenerative braking upon braking the vehicle to charge the batteries in battery module 1000. As shown in FIG. 7, vehicle HV may include charging plug 98 for charging battery module 1000. Battery module 1000 can be charged by connecting charging plug 98 to an external power source.

(Battery Module for Electric Vehicles)

Figure 8:
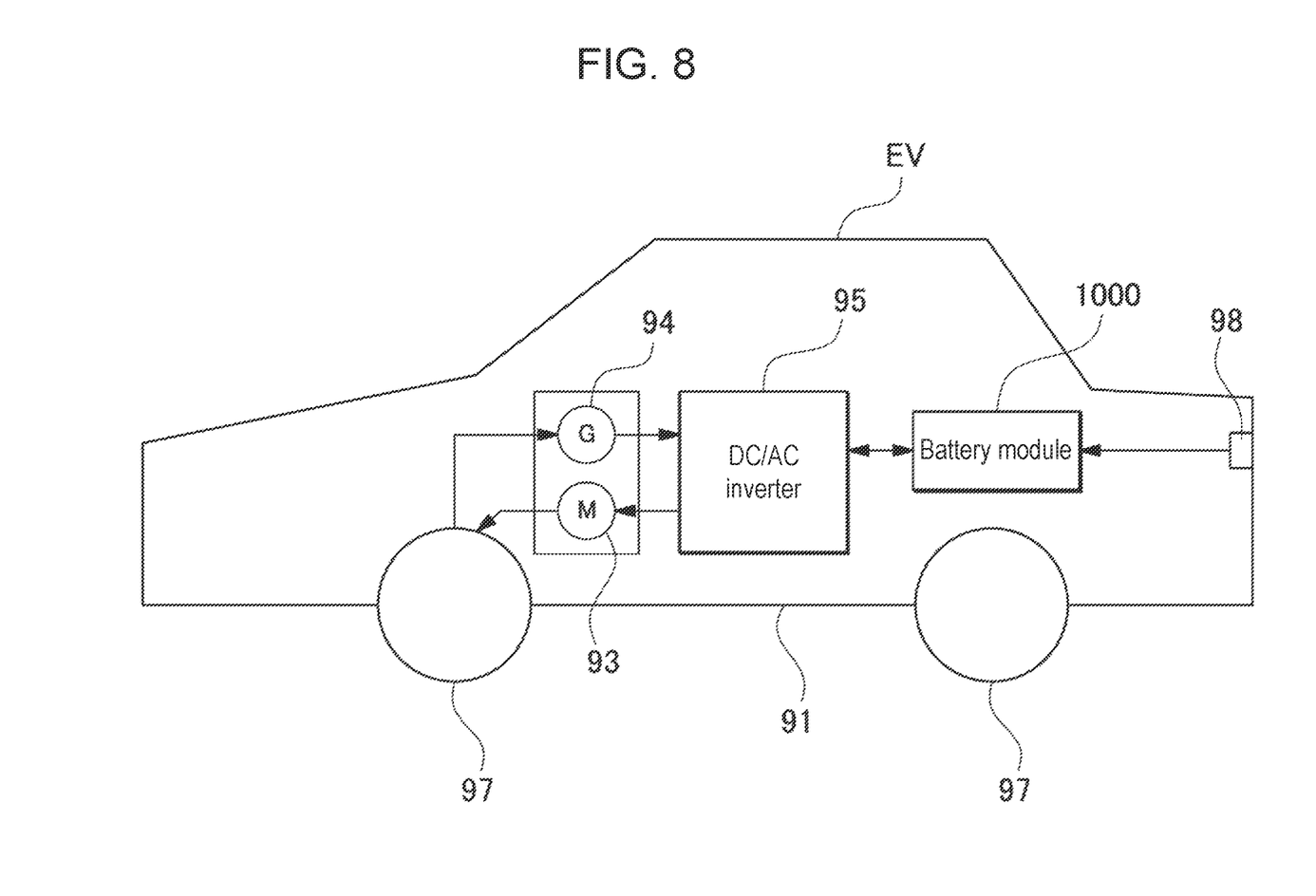
FIG. 8 is a block diagram showing an example in which the battery module is mounted on an electric vehicle travelling only by the motor.

FIG. 8 shows an example in which a battery module is mounted on an electric vehicle traveling only by a motor. Vehicle EV shown in this figure and equipped with the battery module includes vehicle body 91, motor 93 used to travel vehicle body 91, wheels 97 driven by motor 93, battery module 1000 that supplies motor 93 with electric power, and power generator 94 that charges the batteries included in battery module 1000. Battery module 100 is connected to motor 93 and power generator 94 via DC/AC inverter 95. Motor 93 is driven when electric power is supplied from battery module 1000. Generator 94 is driven by energy from regenerative braking of vehicle EV and operates to charge the batteries of battery module 1000. Vehicle EV includes charging plug 98, and charging plug 98 can be connected to an external power source to charge battery module 1000.

(Power Storage System)

Figure 9:
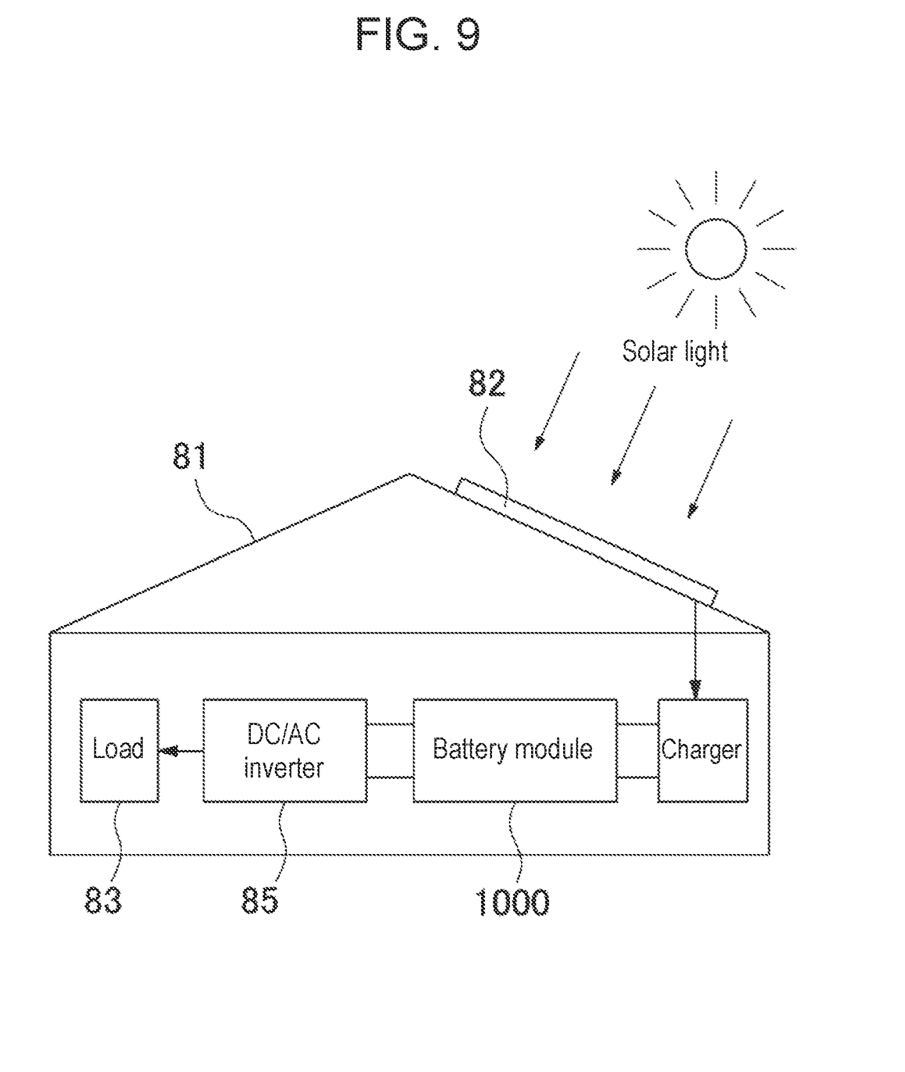
FIG. 9 is a block diagram showing an example applied to a battery module for power storage.

The present invention will not limit application of the battery module only to a power source of a motor used to travel a vehicle. The battery module according to the exemplary embodiment can be used as a power source of a power storage system that charges batteries to store electric power with use of electric power generated through solar power generation, wind power generation, or the like. FIG. 9 shows a power storage system that charges the batteries of battery module 1000 to store electric power with use of a solar battery. As shown in FIG. 9, the power storage system charges the batteries in battery module 100 with electric power generated by solar battery 82 disposed on a roof or a top of building 81 as a house, a plant, or the like. The power storage system supplies, via DC/AC inverter 85, load 83 with electric power stored in battery module 100.

Although not shown, the battery module may alternatively be used as a power source of a power storage system that charges batteries with midnight power to store electric power. The battery module to be charged with midnight power is charged using midnight power as excess power of a power plant and can output electric power during daytime having a large electric power load to limit peak power during daytime. The battery module can still be used as a power source to be charged with both output power of a solar battery and midnight power. The battery module effectively uses both electric power generated by the solar battery and midnight power to efficiently store electric power in consideration of weather and power consumption.

The power storage system described above can be suitably applied as a backup battery module mountable on a rack of a computer server, a backup battery module for a wireless base station of cellular phones, a power source for storage at home or at a plant, a power storage device combined with a solar battery to be applied as a power source for street lights or the like, and a backup power source for traffic lights or road traffic indicators.

INDUSTRIAL APPLICABILITY

A method of cooling the battery module according to the present invention, a cooling program, a computer-readable recording medium and a device for storing the computer-readable recording medium, and a battery module and a vehicle equipped with the battery module can be suitably used as a heavy current power source used for a power source of a motor that drives an electrically driven vehicle like a hybrid vehicle, a fuel cell vehicle, an electric vehicle, an electric motorcycle, or the like. Examples include battery modules of plug-in hybrid electric vehicles that can switch between the EV drive mode and the HEV drive mode, hybrid electric vehicles, electric vehicles, and the like. The battery module can be appropriately used for the applications such as a backup battery module mountable on a rack of a computer server, a backup battery module for a wireless base station of cellular phones, a power source for storage at home or at a plant, a power storage device combined with a solar battery to be applied as a power source for street lights or the like, and a backup power source for traffic lights.

REFERENCE MARKS IN THE DRAWINGS 100, 200, 1000: battery module
1: battery cell
1X: terminal surface
1a: exterior can
1b: sealing plate
2: electrode terminal
2a: protrusion
2b: welding surface
3: bus bar
10: battery stack
13: fixing component
15: fastening member
16: insulating spacer
17: end surface spacer 18: insulating material
20, 20B: end plate
21, 21B: overlapping portion
22: block portion
23: covering surface
24: block screw hole
25: plate body
26: plate screw hole
27: bolt
40: main body
44: bent portion
81: building
82: solar battery
83: load
85: DC/AC inverter
91: vehicle body
93: motor
94: power generator
95: DC/AC inverter
96: engine
97: wheel
98: charging plug
301: bus bar holder
900: power storage device
901: power storage element
915: bind bar
920: end plate
SP1: welding position
HV: vehicle
EV: vehicle

The invention claimed is:

1. A battery module comprising:
a plurality of battery cells each having electrode terminals;
a pair of end plates that cover both side end surfaces of a battery stack including the plurality of stacked battery cells; and
a plurality of fastening members that fasten the end plates to each other,
wherein each of the end plates includes an overlapping portion that covers at least a portion of each of the fastening members covering each side surface of the battery cells located on the both side end surfaces of the battery stack, such that said portion of each of the fastening members is sandwiched, in a direction parallel to a terminal surface on which the electrode terminals are provided, between the overlapping portion and said each side surface of the battery cells, and the overlapping portion and the fastening members are welded and fixed.

2. The battery module according to claim 1, wherein the overlapping portion is continuously formed along a vertical direction of each of the end plates.

3. The battery module according to claim 1, wherein the overlapping portion is formed so as to be flush with a side surface of each of the end plates.

4. The battery module according to claim 1, wherein each of the end plates includes the overlapping portions formed on left and right side surfaces of each of the end plates, respectively, and an interval between the overlapping portions in plan view coincides with an interval in plan view of the battery stack.

5. The battery module according to claim 1, wherein each of the end plates includes a plate-shaped plate body, and the plurality of overlapping portions are fixed to respective sides of the plate-shaped plate body by screwing.

6. A vehicle comprising the battery module according to claim 1, the vehicle comprising:
the battery module;
a driving motor supplied with electric power from the battery module;
a vehicle body including the battery module and the driving motor mounted on the vehicle body; and
a wheel driven by the driving motor to allow the vehicle body to travel.

* * * * *